(Model.)

T. G. BENNETT.
Method and Apparatus for Annealing Cartridge Shells.
No. 232,882. Patented Oct. 5, 1880.

Witnesses.
Sidney P. Hollingsworth
Nathan C. Lane

Inventor.
T. G. Bennett
by Dodge & Son
Attys.

UNITED STATES PATENT OFFICE.

THOMAS G. BENNETT, OF NEW HAVEN, CONNECTICUT, ASSIGNOR TO THE WINCHESTER REPEATING ARMS COMPANY, OF SAME PLACE.

METHOD AND APPARATUS FOR ANNEALING CARTRIDGE-SHELLS.

SPECIFICATION forming part of Letters Patent No. 232,882, dated October 5, 1880.

Application filed August 25, 1880. (Model.)

*To all whom it may concern:*

Be it known that I, THOMAS G. BENNETT, of New Haven, in the county of New Haven and State of Connecticut, have invented certain Improvements in Method and Apparatus for Annealing Cartridge-Shells, &c., of which the following is a specification.

This invention relates to the annealing of cartridge-shells or similar articles; and the invention consists, first, in an improved method of presenting the shells or articles to the action of a flame or jet, so as to heat the same all around uniformly; and, second, in a novel apparatus to be used for that purpose, all as hereinafter more fully described.

Figure 1:
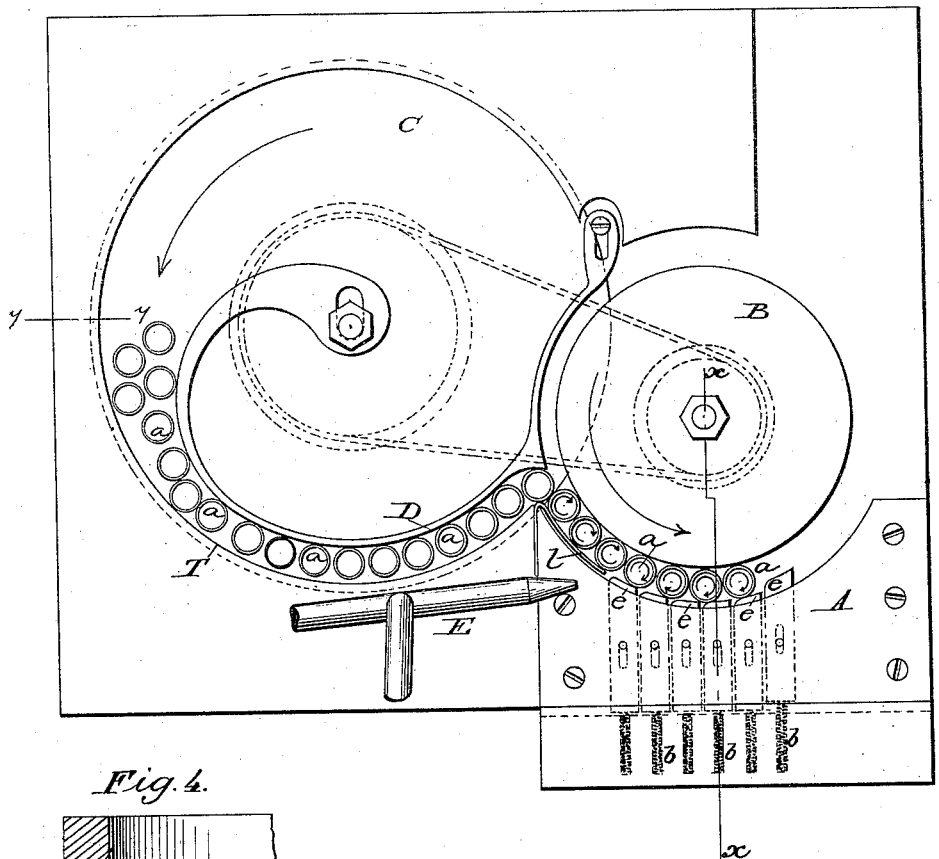
Figure 4:
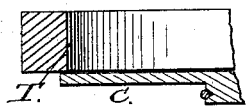
Figure 2:
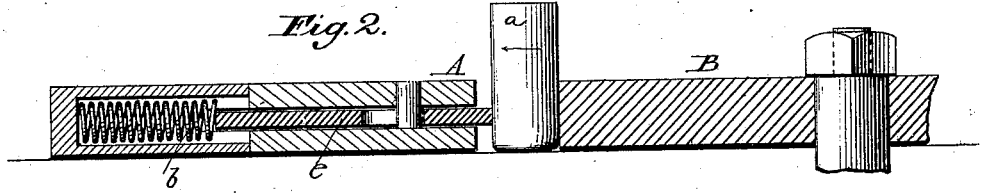
Figure 3:
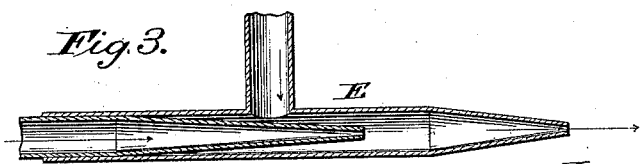

Figure 1 is a top-plan view, and Fig. 2 a transverse vertical section on the line *x x* of Fig. 1, of an apparatus embodying and illustrating my invention. Fig. 3 is a longitudinal sectional view of the nozzle for producing the flame. Fig. 4 is a transverse vertical section on the line *y y* of Fig. 1.

In the various processes of drawing, reducing, and otherwise operating upon the metal to form a finished cartridge-shell, the metal, as is well known, is rendered harder and more granular in its nature, and is therefore liable to fracture in the various operations to which it is subjected. To obviate this it is necessary, and has long been customary, to anneal the shells at various stages of their manufacture, and to do this various methods have been adopted, among others that of setting the shells on a dial, by which they are carried along between a series of gas flames or jets arranged in parallel rows on opposite sides of the shells, which thus pass along between the opposing flames. It will at once be seen that shells subjected to the action of flames thus arranged and simply carried along between them will not be uniformly heated all around, and therefore will not be equally annealed on all sides.

To obviate this objection and secure uniformity in the annealing of shells, I have devised the method of causing the shells to be turned or rotated (each on its own axis) as they are carried along and subjected to the action of the flame, whereby all its sides are equally brought in contact with the flame, and are thus uniformly heated and annealed.

Various devices may be used for applying this method, the essential requisites being a stationary body or ledge, against which the shells may be rolled along by means of a corresponding moving body, and a suitable nozzle, arranged to direct the flame upon them as they are thus rolled and moved along.

The device or machine shown in the drawings is one of the simplest and most convenient known to me for the purpose, and will serve to fully illustrate my invention.

In the drawings, A represents the stationary ledge or shoulder against which the shells are rolled by the edge of a rotating disk, B, as shown in Fig. 1.

In order to adapt the machine to receive and operate on shells of various sizes, a yielding or spring bearing is applied to the bearing-shoulder A, of such a character that while it will hold shells of one diameter in contact with the edge of the rotating disk it will yield sufficiently to admit shells of a greater diameter. This yielding or spring bearing may consist of a flat spring arranged along the face of the ledge A, as represented at *l*, Fig. 1, or it may consist of a series of slides, *e*, arranged to have their ends project from the face of the ledge A, with springs *b* to press them outward, as represented in Fig. 1 and enlarged in Fig. 2. When these spring-slides are used they should be made so narrow that but a single one of them can bear against a shell at once, so that there may be no danger of the shells being retarded in their passage, even in case shells of different diameters being mixed and fed to the machine at the same time. A band or strip of rubber may be used for this yielding support, and can be readily applied either to the support A or to the disk B, and if made sufficiently soft would aid materially in imparting the desired motions to the shells.

It is obvious that the yielding support may be dispensed with by having a series of supports, A, each having its concave supporting-edge cut on a circle of different diameter, according to the varying sizes of the shells, so that when applied each would leave a channel between its face and the periphery of the disk B equal in width to the diameter of the particular-sized shell for which it was designed; but as there are many sizes of these shells made a large number of the plates would be required and much time consumed in changing them, and hence it is better to provide the ledge or plate A with a yielding or self-adjusting support, as described, for by so doing a single plate, A, may be made to answer for many sizes of shells. It is also obvious that this yielding support, whatever its form or kind, may be applied to the disk or moving part instead of to the stationary part, as the result would be the same; and in case rubber be used it may be applied to both with equal or even greater advantage, as also may leather, felt, or any similar yielding material of a nature suitable for the purpose.

For the purpose of readily feeding the shells to the channel through which they are to be rolled along, as above described, I arrange what is termed a "friction feed-dial," C, with guides D and T, as represented in Fig. 1, so that it is only necessary for the attendant to set the shells on end on the dial C, as represented, when they will be at once carried along between the guides D T and delivered into the mouth of the channel between the disk B and support A, through which channel they will be rolled along, as described, while being acted upon by the flame from the nozzle E.

The inner guide, D, is provided with slots at its ends, by which it can be adjusted for shells of different sizes. The outer guide, T, may extend all or only part of the way around the dial C, and it may consist of a raised rim of metal, or, as represented in Figs. 1 and 4, it may be formed by sinking the dial a suitable distance below the face of a table which surrounds it, the inner surrounding edge of the table thus forming the guide. This latter plan is preferable, as it leaves a smooth surface, from which the shells can be readily shoved off onto the dial, while if the raised guide or rim were used the shells would have to be lifted over it.

In order to produce a highly-heated and economical flame the nozzle E is constructed as shown in section in Fig. 3, or in any equivalent manner, so that either air or steam may be forced through one of the pipes while gas enters through the other, the two bodies being commingled before issuing from the nozzle, and burning as they issue in a flame of great intensity. This nozzle E is set oblique to the line of travel of the shells, and is made adjustable, so it can be set at any desired angle, and thus cause the flame to impinge upon the shells for a considerable distance along their line of travel, so as to insure at least one entire rotation of the shell while in the path of the flame.

It is obvious that more than one jet may be used if desired, and that the length of time that the shells shall be subjected to the action of the flame may be regulated by the width and angle of the flame or the number of flames used, and also by the speed with which the shells are moved, these all being capable of being changed or regulated at will.

The disks B and C may be connected by a band or cord, as indicated by the dotted line in Fig. 1, and motion may be imparted to them in any suitable manner.

By the method and means above described I am enabled to anneal cartridge-shells or any similar article in a most perfect and uniform manner.

Having thus described my invention, what I claim is—

1. The herein-described method of annealing cartridge-shells or similar articles—that is to say, by causing them to rotate on their axes while being moved along in contact with a flame, substantially as described.

2. The combination of a stationary ledge or support, A, the rotating disk B, or equivalent moving body for rolling the shells, and a nozzle, E, for directing the flame upon them while being rotated, substantially as and for the purpose set forth.

3. A yielding support, substantially such as described, in combination with a stationary ledge or support, A, and a rotating disk, B, or equivalent moving body, the said parts being arranged to operate substantially as herein set forth.

THOMAS G. BENNETT.

Witnesses:
DANIEL H. VEADER,
GEO. E. HODSON.